United States Patent [19]

Harvey

[11] 4,229,398
[45] Oct. 21, 1980

[54] METHOD AND APPARATUS FOR THE CONTINUOUS PRODUCTION OF A BLOCK OF RECONSTITUTED FOAM MATERIAL

[75] Inventor: Richard G. Harvey, Buckinghamshire, England

[73] Assignee: Dunlop Limited, London, England

[21] Appl. No.: 14,616

[22] Filed: Feb. 23, 1979

[30] Foreign Application Priority Data

Mar. 3, 1978 [GB] United Kingdom ............... 8483/78

[51] Int. Cl.² ...................... B29C 29/00; B29D 27/00
[52] U.S. Cl. .................................. 264/113; 264/255; 264/321; 264/DIG. 7; 425/407; 425/414
[58] Field of Search ............... 264/DIG. 7, 272, 321, 264/42, 51, 255, 113; 425/407, 414

[56] References Cited

U.S. PATENT DOCUMENTS

| 1,803,814 | 5/1931 | Spengler et al. ............ 264/113 X |
| 2,307,371 | 1/1943 | Hileman ....................... 264/272 X |
| 2,892,216 | 6/1959 | Steel ............................ 264/DIG. 7 |
| 3,004,293 | 10/1961 | Kreidl ......................... 264/DIG. 7 |
| 3,042,988 | 7/1962 | Goransson et al. ............ 264/42 X |
| 3,164,860 | 1/1965 | Oxel .................................. 264/51 |
| 3,198,856 | 8/1965 | Hammond et al. ............ 264/113 X |
| 3,336,184 | 8/1967 | Stastny et al. ............... 264/DIG. 7 |
| 3,401,128 | 9/1968 | Terry .......................... 264/DIG. 7 |
| 3,452,122 | 6/1969 | Stern et al. ................. 264/DIG. 7 |
| 3,452,127 | 6/1969 | Lovette et al. ............. 264/DIG. 7 |
| 3,517,414 | 6/1970 | Carson ......................... 264/321 X |

Primary Examiner—Philip Anderson
Attorney, Agent, or Firm—Stevens, Davis, Miller & Mosher

[57] ABSTRACT

Method for the continuous production of a cylindrical block of reconstituted foam material. A charge of foam crumb (together with a binder) is placed in an open-ended mould, supported therein and compressed to a height of about one foot. The product is lowered from the mould and maintained relative thereto so as to provide a support to receive a further charge of foam crumb and binder. The further charge is compressed so that it unites with the first-mentioned charge. Further charges of crumb and binder are added, and the method-steps repeated, as often as necessary. An apparatus is provided in which the method may be performed.

7 Claims, 6 Drawing Figures

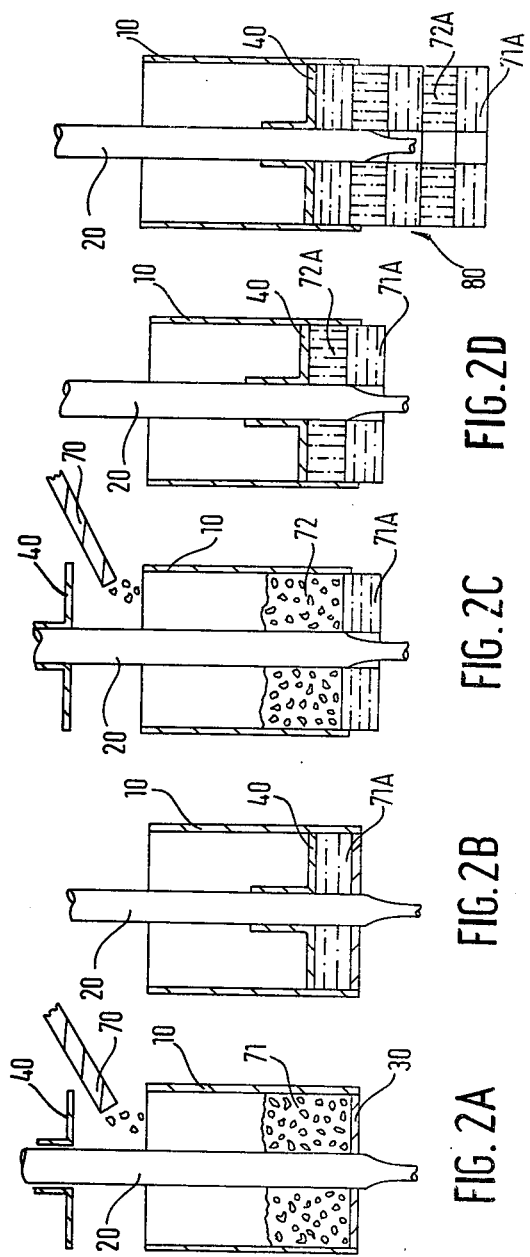

METHOD AND APPARATUS FOR THE CONTINUOUS PRODUCTION OF A BLOCK OF RECONSTITUTED FOAM MATERIAL

This invention relates to a method for the continuous production of a block of reconstituted foam material, to apparatus for carrying out the method.

Reconstituted foam material is conventionally made by mixing scrap foam (foam crumb) with a suitable binder, compressing the mixture in a mould of the desired dimensions, and heating the mixture in the mould (suitably by passing steam through the mixture) to cure the binder and form a solid product. The present invention will be described herein with particular reference to the production of reconstituted polyurethane foam, where the crumb comprises scrap polyurethane foam and where the binder comprises the reaction product of a polymeric polyol having terminal primary hydroxyl groups and an organic polyisocyanate. Such a reconstituted polyurethane foam is available from Dunlop Limited as REPOL (Registered Trade Mark). However, it will be appreciated that the method and apparatus of the present invention are equally applicable to the production of other (non-polyurethane) reconstituted foam materials.

When making reconstituted polyurethane foam materials by the method described in the immediately-preceding paragraph, it has been found that a wide variation in product density can and does occur. (For example, a moulding or reconstituted polyurethane foam having a thickness of 3 feet can exhibit a variation of up to 20 $Kg/m^3$ above or below its mean density). Clearly, such a variation limits the usefulness of the reconstituted foam product and has, hitherto, meant that the cost of reconstituting foam scrap exceeds considerably the market value of the product. As a result, a considerable amount of foam scrap has hitherto been dumped.

We have now found that a block of reconstituted foam material having a substantially uniform density throughout may be made by continuously moulding a plurality of such blocks, each block having a relatively limited thickness, one above the other in a cylindrical mould and arranging to join adjacent blocks together during the moulding process.

A major end-use of reconstituted foam material is in floor-coverings, especially underlay for carpets and the like. A convenient method of forming reconstituted foam material into sheets of a thickness suitable for underlay (viz. ¼ inch to ¾ inch) is to take a cylindrical block of reconstituted foam material and to "peel" the block using commercially-available foam conversion equipment. However if a solid cylindrical moulding is "peeled" completely, sheeting of nonuniform configuration is produced since, at small diameters, the sheet will try to maintain the curvature of the cylinder. The alternative is to "peel" only so far as is possible to yield a sheet of uniform thickness and this results in an unacceptable amount of waste material.

We have now found that such wastage can be avoided by moulding a cylindrical block of reconstituted foam having a hollow axial core.

Accordingly, the present invention provides, in one aspect, a method for the continuous production of a cylindrical block of reconstituted foam material, the method comprising:

(a) Placing in a moulding cavity a mixture of foam crumb and a compatible binder;
(b) Compressing the mixture to a thickness of about 1 foot;
(c) Heating the mixture to cure the binder and form a solid product;
(d) Lowering said solid product from the moulding cavity and supporting said solid product relative to the cavity to provide a surface for the reception of a further mixture of foam crumb and binder;
(e) Placing a further mixture of foam crumb and binder above the solid product;
(f) Repeating steps (b) (c) (d) and (e) (above) until a block of the required thickness is obtained.

Preferably, the foam crumb may be a polyurethane foam crumb and the binder may be the reaction product of an organic polyisocyanate and a polymeric polyol having terminal primary hydroxyl groups. A core member may also be disposed axially relative to the cavity so that a product having a hollow axial core is produced.

In a second aspect, the present invention provides apparatus for the continuous production of a cylindrical block of reconstituted foam material, the apparatus comprising:

(i) A vertically-disposed, cylindrical, open-ended moulding cavity;
(ii) A support member, placed at the lower end of the cavity and movable relative thereto;
(iii) A compression member, placed at the upper end of the cavity and movable relative thereto;
(iv) Means to heat the cavity and any contents thereof.

In a preferred embodiment, the present invention provides apparatus as described in the immediately-preceding paragraph, the apparatus including a core member disposed axially relative to the cylindrical cavity (i), whereby a cylindrical moulding having a hollow axial core can be produced.

Throughout this specification, the term "cylindrical" (as applied to the moulding cavity or to the product) means "of uniform cross-section throughout".

Preferably, the moulding cavity and the product will be of circular-cylindrical configuration.

A continuous process for the production of a cylindrical block of reconstituted polyurethane foam will now be described, merely by way of example, with reference to the accompanying drawings.

In the drawings,

FIGS. 2A to 2E show the use of the apparatus of FIG. 1 in the continuous production of a block of reconstituted foam material.

Figure 1:
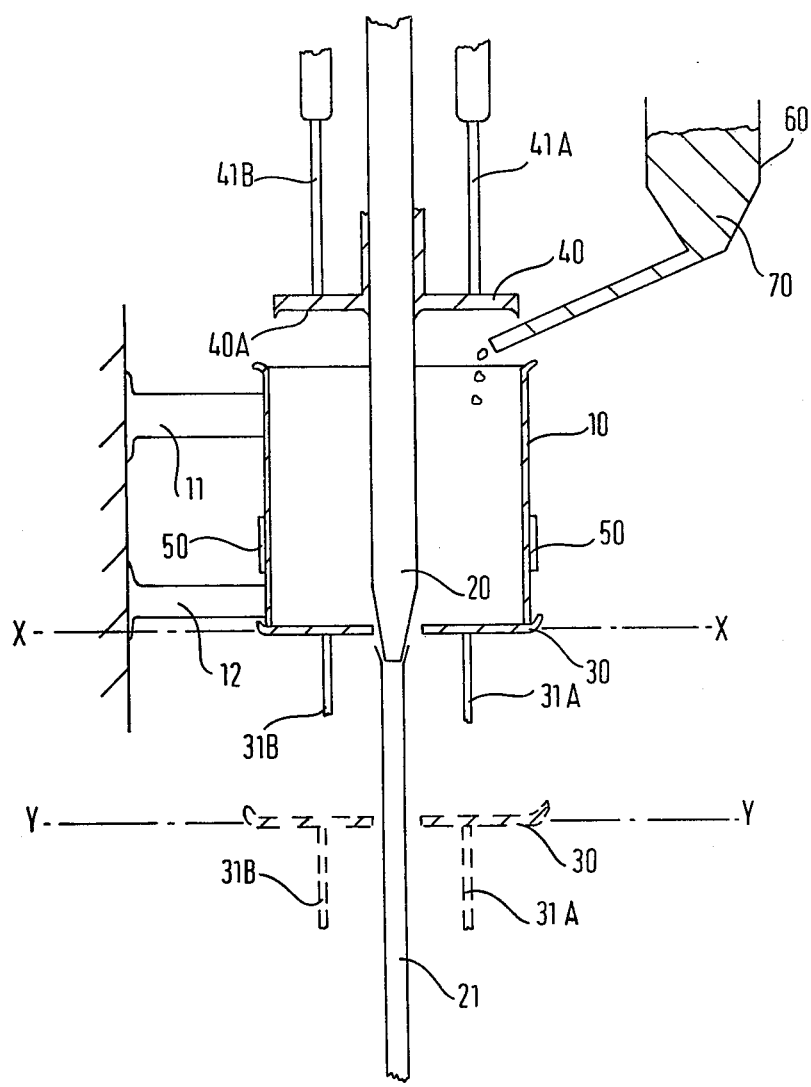
FIG. 1 is a schematic view, in longitudinal section, of apparatus suitable for the continuous production of a block of reconstituted foam material.

Referring now to FIG. 1, a cylindrical, open-ended mould 10 of diameter 5 feet and height 4 feet 6 inches is supported vertically on members 11 and 12. A 1 foot-diameter core 20 is supported along the axis of the mould by means of guide 21.

The lower end of the mould is closed by means of support member 30, which is movable relative to the mould (e.g. from position XX to position YY) by means shown schematically at 31A and 31B.

The upper end of the mould is provided with a compression member 40, this member having dimensions such that it is a sliding-fit within the mould 10 and being movable relative to the mould by means shown schematically at 41A and 41B.

The mould is surrounded by a steam-jacket shown schematically at 50.

A feed hopper 60 contains a mixture 70 of foam crumb and binder for placing in the mould.

Referring now to FIGS. 2A to 2E, the bottom of the mould is closed by means of member 30 and a charge 71 of foam crumb and binder is placed therein (FIG. 2A). The compression member 40 is lowered into the mould and compresses the charge 71 between itself and the member 30 to form a solid product 71A (FIG. 2B). The product 71A is lowered (by means not shown) from the mould and maintained in a position relative to the mould so that a further charge 72 can be placed on top of it (FIG. 2C). The compression member is again lowered to compress the charge 72 into a solid product 82A (FIG. 2D).

FIG. 2E shows a solid product (indicated generally at 80) resulting from a repetition of the processes shown in FIGS. 2C and 2D. The product 80 may be cut to any desired length (e.g. by means of a saw or other blade) in a direction perpendicular to its axis.

In FIGS. 2A to 2E, the steam-jacket 50 has been omitted for clarity, but it is to be understood that some form of heating of the mould is necessary between charging and compressing each portion of foam crumb-/binder mixture.

Although the time-scale of the various operations shown in FIGS. 2A to 2E is sufficiently short to ensure good bonding between successive compressed charges (e.g. between products 71A and 72A), it may be necessary to apply a thin coating of binder to the upper surface of one solid product (e.g. 71A) before inserting a further charge (e.g. 72).

The lower surface 40A of the compression member 40 may be provided with a serrated profile to assist the production of a high surface area on the upper surface of one solid product (e.g. 71A) and ensure optimum bonding of a subsequent solid product (e.g. 72A) thereto.

We have found that, where the thickness of each of the solid products (e.g. 71A and 72A) is restricted to around 1 foot, the overall variation of density in the products is of the order of 5 Kg/m$^3$ above or below the mean density, compared to the variation of ±20 Kg/m$^3$ from the mean density found in solid reconstituted foams made by known methods (i.e. blocks of thickness 3 feet or greater).

Having now described my invention, what I claim is:

1. A method for the continuous stepwise production of a cylindrical block of reconstituted foam material from foam crumb comprising:

(a) Placing in an open-ended moulding cavity a mixture of foam crumb and a binder compatible with said mixture;
   (b) Compressing the mixture to a height of about 1 foot;
   (c) Heating the mixture to cure the binder and form a solid product layer;
   (d) Lowering said solid product layer from the moulding cavity and supporting said solid product layer relative to the cavity to provide a solid product layer surface at one end of said cavity for the reception of and binding to of a further mixture of foam crumb and binder;
   (e) Placing a further mixture of foam crumb and binder on the solid product layer surface;
   (f) Repeating steps (b) (c) (d) and (e) to create successively connected solid product layers until a block of the required length is obtained.

2. The method of claim 1, wherein the foam crumb comprises polyurethane foam.

3. The method of claim 1, wherein the binder comprises the reaction product of an organic polyisocyanate and a polymeric polyol having terminal primary hydroxyl groups.

4. The method of claim 1, wherein a core member is disposed axially relative to the moulding cavity, whereby a cylindrical block having a hollow axial core is produced.

5. An apparatus for the continuous production of a cylindrical block of reconstituted foam material comprising: a vertically-disposed, cylindrical, open-ended moulding cavity; a support member, placed at the lower end of said cavity and movable relative to said cavity; a compression member, placed at the upper end of the cavity and movable relative to said cavity for compressing a charge of foam crumb and binder in said cavity to a height of approximately one foot; means for feeding a charge of foam crumb and binder to said cavity; means for heating the cavity and a charge of foam crumb and binder therein; said compression member compressing a charge of foam crumb and binder and said heating means heating said cavity during said compression such that a layer of reconstituted foam material is formed, said support member being movable to lower said layer from said cavity to an extent that a surface of said layer previously contacting said compression member forms a cavity support surface for a subsequent charge of foam crumb and binder.

6. The apparatus of claim 5, wherein a core member is disposed axially relative to the moulding cavity.

7. The apparatus of claim 5, wherein the moulding cavity is of circular-cylindrical configuration.

* * * * *